United States Patent Office 3,467,602
Patented Sept. 16, 1969

3,467,602
PREPARING POROUS REFRACTORY OXIDES BY ADDING AND REMOVING POLYPROPYLENE MICROSPHERES
David W. Koester, Wilmington, Del., assignor to Air Products and Chemicals, Inc., Philadelphia, Pa., a corporation of Delaware
No Drawing. Filed Oct. 24, 1966, Ser. No. 588,758
Int. Cl. B01j 11/50, 11/40
U.S. Cl. 252—455
3 Claims

ABSTRACT OF THE DISCLOSURE

Beta alumina trihydrate is mixed with dilute nitric acid and 35 micron polypropylene microspheres constituting about 10% of the weight of the ultimate eta alumina, and the composition is extruded and sliced into pellets. The pellets are dehydrated in a high humidity nitrogen atmosphere at an elevated temperature at which most of the polypropylene is thermally decomposed and volatilized. The dehydrated pellets are heated in an atmosphere containing oxygen to burn residual organic matter. The eta alumina pellets have a pore size distribution advantageously superior to conventional eta alumina pellets. Kaolin or silica or related refractory oxide pellets having advantageous distribution of pore size are prepared by similar usage of the polypropylene microspheres.

---

This invention relates to refractory oxide particles having a high surface area, low pellet density, an advantageous combination of crushing strength, attrition resistance, and related ruggedness characteristics, and particularly pore structure comprising pores large enough to permit ready diffusion of gaseous aromatic hydrocarbon molecules. Industry has employed sorptive refractory oxide particles for a great variety of end uses, including use as drying agents, contact materials, sorbents, catalysts, and catalyst carriers.

Sorptive refractory oxide particles can be prepared by calcination of particles of a plastic composition consisting of clay and water. It has long been known that the quantity of water employed in a wet clay plastic composition affects the ultimate properties such as pore volume, density, crushing strength, etc. of the calcined clay and the distribution of pore volume according to pore size. It has been known that the crushing strength of calcined clay is adversely affected by the inclusion of excessive amounts of water in the plastic clay precursor, but that the use of more than minimum amount of water in the precursor increases the total pore volume of the calcined clay.

Heretofore it has been known that the permeability of an inorganic sorptive material could be modified during the shaping of the plastic precursor by the inclusion of a material which could subsequently be removed by combustion, the relationships having some analogy to the relationships governing the use of more than minimum water for increasing the permeability of the ceramic product. Combustible materials such as carbon black, sawdust, straw, starch, and resins have been included in precursor compositions during the molding and shaping steps and burned out during subsequent calcination. Ordinarily the combustible nature of such material has been stressed without concern about its size or shape. On the theory that an interconnected network of passageways would exist after the combustion of organic fibers, it has been asserted that fiber shape could be advantageous. Some technologists have deemed organic fibers to be undesirably coarse and/or otherwise objectionable in the preparation of contact agents or the like so that this approach toward permeability has not gained widespread usage.

Although combustion of small amounts of organic material in a precursor for contact agents, catalysts, sorbents or the like, is not objectionable, per se, and although relatively large proportions can be suitably burned out during calcination in laboratory apparatus having adequate control elements, numerous problems complicate large scale industrial combustion of organic matter present in large amounts in such a precursor, particularly where temperature control is important to product quality. The engineering estimates for peak temperature can be based upon the analogous combustion of carbonaceous deposit during the regeneration of a bed of granular catalyst. In such regeneration procedures the carbonaceous matter is burned within a limited time at a temperature which is difficult to measure exactly but which can be high enough, unless the combustion is carefully regulated, to sinter and/or otherwise damage the sorptive particles. By regulating the amount of oxygen to significantly less than that of air (e.g. by using diluted air by admixture with an inert gas such as flue gas) the peak temperature can be kept below the danger point even when the weight of organic matter per unit volume is above the tolerable limits for undiluted air for the combustion. In the design of either catalyst regeneration systems or in systems for burning organic matter from precursors for sorptive refractory oxides, efforts have been made to provide systems in which the concentration of combustible organic matter is low enough to permit combustion control without resort to dilution of air with inert gas.

When a wet clay is extruded into strands, elevated temperatures such as 60° C. or higher, and very high pressures such as several kg./cm.$^2$ or higher, are encountered during passage through the extrusion zone. Some solid crystals are liquified at such extrusion conditions so that a material may have properties within the extrusion zone different from its properties either before or after extrusion. Thus some particles moving through an extrusion zone may tend to be plasticized and formed into elongated particles linearly aligned with the linear axes of the extruded strands.

In accordance with the present invention sorptive refractory oxide particles having a relatively high pore volume of pores in the 1,000 to 30,000 Angstrom (0.1 to 3 micron) diameter range are prepared as catalysts and/or catalyst carriers for chemical reactions involving aromatic organic compounds. Such favorable 0.1 to 3 micron pore distribution is achieved, not by the use of particles of the 0.1 to 3 micron size range, but by utilization of particles from about 1 to about 100 microns in diameter, preferably with the bulk of the particles having diameters in the range between 15 and 55 microns.

A precursor composition is modified by the inclusion of a minor amount of solid, resiliently deformable, relatively noncompressable hydrocarbon particles of from about 15 to about 55 microns in diameter. The quantity of hydrocarbon particles employed in the precursor is controlled to be an appropriate percentage of the volume of the calcined refractory oxide, generally from about 10% to 25%, preferably about 14 to 22%, and more desirably about 17±2%. For reasons not clearly established the solid hydrocarbon particles permit the usage of more water and also serve as extrusion aids, whereby precursor particles are formed from such composition by extrusion more readily than in the absence of such hydrocarbon particles.

Subsequently a predominant portion of the hydrocarbon content is removed from an intermediate product by solvent extraction, thermal decomposition, or related procedure effective in removing the solid hydrocarbon component from the intermediate product. As a result of the removal of the predominant portion of the hydrocarbon particles by alternative procedures, only a small portion of the hydrocarbon component must be removed by combustion. The weight percent of residual organic matter, based upon the sorptive refractory oxide product is less than 4%. Accordingly, it is possible and more practical to maintain the temperature during controlled combustion of the residual organic matter at a temperature low enough that the sorptive characteristics of the inorganic particles are not damaged. The burning of the residual organic matter requires a period of time which is not prohibitively expensive. Moreover, the amount of residual organic matter is generally small enough to permit choice of conditions allowing combustion by air instead of requiring the expense of diluting air with inert gas.

In preferred embodiments, the solid hydrocarbon particles are characterized by a particle size averaging about 35 microns and predominantly ranging from about 15 to about 55 microns.

The nature of the invention is further clarified by referring to a plurality of examples.

EXAMPLE I

A sample of beta alumina trihydrate was subjected to screening to evaluate particle size distribution, and it was noted that the material could be classified as follows:

| | Wt. percent of frac. | Cumulative, Percent | Particle size in microns | | Through sieve No. |
|---|---|---|---|---|---|
| | | | From | To | |
| Fraction: | | | | | |
| A | 1.2 | 1.2 | 177 | | |
| B | 6.5 | 7.7 | 149 | 177 | 80 |
| C | 36.0 | 43.7 | 74 | 149 | 100 |
| D | 30.0 | 73.7 | 44 | 74 | 200 |
| E | 26.3 | 100.0 | | 44 | 325 |

A composition was prepared consisting of 22 parts of aqueous nitric acid containing 27.5% nitric acid (prepared by diluting 70% acid) and 100 parts by weight of said alumina beta trihydrate. This composition was modified by the addition of 6.7 parts by weight of a polypropylene powder, corresponding to 10% of the weight of the $Al_2O_3$ in the composition, and corresponding essentially to 17% by volume of the sorptive refractory oxide alumina particles to be prepared. The polypropylene powder consisted entirely of particles having an average size of 35 microns and predominantly within a range from 15 to 55 microns in diameter. The polypropylene particles are available commercially, and are generally employed to impart flatness or minimized gloss to paints, enamels and coating compositions. Photomicrographs of the particles indicate sufficient resemblance to microspheroids to permit usage of terms such as average partial diameter.

The composition consisting of 100 parts of beta alumina trihydrate, 22 parts of 27.5% nitric acid, and 6.7 parts of said 35 micron polypropylene particles was mulled in a Lancaster mixer to provide an extrudable composition in which the polypropylene particles were distributed uniformly. Extrusion of the composition proceeded smoothly, the 10% (based on weight of $Al_2O_3$ in the composition) polypropylene particles imparting a faster speed of strand extrusion than in corresponding strands free from polypropylene. The strands were sliced into pellets. The pellets were dried and then dehydrated following the general procedure of U.S. Patent 2,809,170, in an inert, i.e. nitrogen, high humidity atmosphere whereby the beta alumina trihydrate was transformed to sorptive alumina and substantially all of the polypropylene was volatilized or thermally decomposed. The alumina pellets were then heated in air at 500° C. to burn out any residual carbonaceous material resistant to the thermal decomposition conditions of the dehydration step. The calcined pellets had the desired physical characteristics including macropores in the sought-for size range and a low density.

The pellet density was substantially 1.1 g./ml. The pellets are suitable as catalyst carriers for the manufacture of supported catalysts by the impregnation of the alumina of the present invention and subsequent heating of the impregnated particles. A catalyst consisting of about 0.5% platinum and 99.5% macroporous alumina is advantageous in reforming naphtha. A catalyst consisting of about 20% chromia and about 80% macroporous alumina is advantageous in dehydrogenating butane to butadiene.

Two catalysts were prepared using alumina supports prepared by the identical procedure except for the absence of the polypropylene and the extra (about 5 parts by weight) water from the precursor for the control and their presence in the precursor for the superior support of this invention. Each contained 0.5% by weight platinum on alumina.

An accelerated aging test was conducted charging a low octane number (62 F–1 Clear) naphtha for 100 hours at 505° C. (940° F.), 17 atmospheres pressure (250 p.s.i.g.), a $H_2$/naphtha ratio of 6, and in the presence of 500 p.p.m. sulfur as thiophene added. Some of the pertinent data were as follows:

| | Control | Invention |
|---|---|---|
| Bulk density, kg./L | 0.837 | 0.653 |
| Initial octane No. F–1 Clear | 93.1 | 97.5 |
| Decativation rate: | | |
| ($F_1$/bbl./lb. at 965° F.) | 8.54 | 5.53 |
| Correspondingly ($F_1$/l./g. at 520° C.) | 3.0 | 1.93 |

Thus, the alumina prepared in accordance with the present invention was superior to the control as support for reforming type catalyst both as to deactivation rate and as to initial octane number.

In a similar comparison of the alumina pellets (prior to impregnation with a catalytic metal compound), using a mercury porosimeter at pressures up to about 6000 atm. (about 90,000 p.s.i.g.) it was observed that the pore distributions were approximately as follows:

| Pore diameter | | Measurement of cumulative pore volume with decreasing pore diameter, cc./g. | |
|---|---|---|---|
| Microns | Angstroms | Control | Invention |
| 15 | 150,000 | 0.01 | 0.02 |
| 3 | 30,000 | 0.10 | 0.15 |
| 1 | 10,000 | 0.12 | 0.24 |
| 0.1 | 1,000 | 0.12 | 0.33 |
| 0.01 | 100 | 0.16 | 0.36 |
| 0.002 | 20 | 0.38 | 0.64 |

Particular attention is directed to the relatively large pore volume of the pores from about 1,000 to 30,000 Angstroms or from about 0.1 to 3 microns, inasmuch as the control has small pore volume in this range, whereas the alumina of the invention has numerous pores of this size range.

EXAMPLE II

Powdered alumina trihydrate, constituting 100 parts by weight was mixed with 22 parts by weight of aqueous nitric acid containing 27.5% nitric acid (prepared by diluting technical 70% acid with deionized water) and 6.7 parts by weight of polypropylene powder in a Lancaster type of mixer in which a mulling wheel and plow subjected the components to both mixing and compressive forces. The mixture contained 6.7 parts by weight of polypropylene powder, corresponding approximately to 10% by weight of the $Al_2O_3$ in the composition, and corresponding essentially to 17% by volume of the finally produced sorptive refractory oxide (alumina) particles. The polypropylene employed had an average particle size of about 35 microns and was predominantly in the range from 15 to 55 microns.

A control sample was prepared in similar manner except that the polypropylene addition was omitted so that the 100 parts by weight of the powdered alumina trihydrate and 17 parts by weight of 36.3% nitric acid constituted the mixture charged to the Lancaster mixer. Subsequent processing steps were the same in both instances.

After the damp powder had been mixed in the Lancaster mixer it was directed through a vibrating chute to an extruder. The composition was extruded, and it was observed that the precursor of the present invention extruded more readily than the control composition, thus indicating that the polypropylene functions as an extrusion aid. The strands of extruded composition were sliced into cylindrical pellets having length approximately 2 to 3 times the 1.6 millimeter diameter.

The pellets were dried and then dehydrated in an inert atmosphere with flowing nitrogen as purge gas. Substantially all of the polypropylene was volatilized from the precursor of the present invention during the dehydration treatment so that only a minor amount of the polypropylene remained to be burned out subsequently during the following more severe calcination at elevated temperature in an oxidizing atmosphere.

The severe calcination treatment of the particles was at 760° C. (1400° F.) for 4 hours in a mixture of 80% air and 20% steam. The particles were cooled to room temperature and subjected to a series of measurements. The 1.6 mm. pellets of sorptive alumina were impregnated with an aqueous solution of chromic acid containing sufficient sodium chromate to provide 20% chromia and 0.5% sodium measured as sodium oxide in the catalyst. The impregnated alumina particles were given a final heat treatment at 760° C. for 4 hours in 20% steam, whereby the surface area was reduced to a value which could remain moderately stable during a year of use in manufacturing butadiene. Data relating to the two samples of catalyst include:

|  | Control | Invention |
|---|---|---|
| Surface area m.²/g | 88 | 88 |
| Bulk density kg./l | 1.01 | 0.83 |
| Wt. per unit volume, percent | 100 | 82 |
| Loading requirement, percent | 122 | 100 |

Butane was dehydrogenated over chromia on alumina catalysts at a pressure of about 0.158 atmosphere and a space rate of about 1 volume of butane per volume of catalyst per hour, and the average bed temperature was 590° C. Data relating to the effectiveness of the above two catalysts were:

|  | Control | Invention |
|---|---|---|
| Conversion (C₄ disappearance) wt. percent | 77.1 | 82.4 |
| Selectivities, wt. percent: |  |  |
| Butenes | 47.9 | 44.8 |
| Butadiene | 25.9 | 28.5 |
| Total | 73.8 | 73.3 |
| Percent C₄H₆ increment | 100 | 110 |
| C₄C₆ per unit wt. catalyst, percent | 100 | 134 |

Thus at 590° C., each kilogram of catalyst derived from the polypropylene-containing precursor permitted production of about 34% more of the valuable $C_4H_6$ product than the otherwise identically prepared catalyst of higher density. Similar tests at 540° C. and 560° C. indicated a similar superiority of 48 and 40% respectively for the catalyst derived from the polypropylene-containing precursor.

EXAMPLE III

The procedure of Example II is followed, but the quantity of polypropylene particles is increased to 8.15 parts, corresponding to about 12.5% of the weight of $Al_2O_3$ in the ultimate particle and to about 22% by volume of the alumina particle. Catalysts prepared using such macroporous alumina as a carrier have advantageous properties.

EXAMPLE IV

The procedure of Example II is followed, except that the quantity of 35 micron polypropylene particles is about 7.5% of the weight or 14% of the volume of the macroporous alumina particles. Catalysts prepared using such macroporous alumina pellets as a carrier are useful in hydrogenation and dehydrogenation reactions.

EXAMPLE V

Precursors for kaolin cracking catalyst pellets are prepared by extruding and slicing a mixture of kaolin, sulfuric acid and 35 micron polyproylene particles corresponding to about 17% (e.g. from 15 to 19%) of the volume of the calcined cracking catalyst. The precursor particles are subjected to aging and reductive calcining in an atmosphere containing carbon monoxide whereby a predominant portion of the polypropylene is removed without combustion along with the bulk of the sulfur, as sulfur oxides, from the sulfuric acid. The particles are oxidatively calcined to burn out residual organic matter. Thus, except for the inclusion of the polypropylene particles, the kaolin cracking catalyst is manufactured by the same procedure as that which has been employed industrially for many years. The macroporous kaolin cracking catalyst particles prepared from the polypropylene-containing precursor are sufficiently rugged to be useful in fixed bed reactors for hydrocarbon processing and have an advantage of greater pore volume of pores of the size from about 0.1 to 3.0 microns than conventional kaolin cracking catalyst.

EXAMPLE VI

Dry pulverized silica gel, 35 micron polypropylene microspheroids constituting about 18 volume percent of the sorptive silica particle, and a suspension of colloidal silica in a volatilizable liquid such as water, are mixed to form a paste, which is shaped into 4 mm. silica beads. Drying of the beads at 110° C. provides beads strong enough to be handled. Solvent extraction with refluxing tetrachloroethylene permits extraction of most of the polypropylene from the silica beads. Calcination of the solvent-extracted silica gel yields sorptive silica beads having an advantageous combination of macroporosity, ruggedness, and surface area. The beads are useful as gas treating agents or as supports for catalytically active additives.

EXAMPLE VII

A batch of silica alumina cracking catalyst containing about 15% alumina and 85% silica is prepared by a procedure in which resilient polypropylene powder is employed as a porosity agent which is removed predominantly by solvent extraction. A batch of about 100 kilograms is prepared by starting with 23 kilograms of water heated to about 90° C. in which is dissolved about 26 kilograms of tetramethyl ammonium hydroxide. Then 23 kilograms of alpha alumina trihydrate are added to the alkaline solution, which is subjected to intense turbulence by a rapidly rotating impeller. A mixture of about 85 kilograms of water and 27 kilograms of tetramethyl ammonium hydroxide is heated at about 90° C. and subjected to intense turbulence during the addition of about 85 kilograms of silica of small particle size, such as diatomaceous earth, powdered silica gel and/or mixtures thereof.

A small capacity mixer having an impeller providing intense turbulence is modified to accept continuously two feed streams and to discharge continuously an overflow stream resulting from the mixture of the two feed streams. The flow rates are so controlled that the previously described tetramethyl ammonium aluminate solution and the tetramethyl ammonium silicate solution are fed at about 90° C. into the mixer and thence into a larger capacity holding vessel having a high speed impeller. The streams react to form a gelatinous silica alumina dispersed in the aqueous tetramethyl ammonium hydroxide. The flow rates assure maintenance of the weight proportions of 85 $SiO_2$ to 15 $Al_2O_3$ in the product. After the entire batch of silica alumina is transferred to the large reactor, the system is cooled to about 70° C. and the reaction mixture is acidified by injection of carbon dioxide. The mixture is diluted with about 50 kilograms of methanol so that the solvent contains the quaternary carbonate salt and suspended particles of silica alumina. After agitation, the impeller is stopped to permit the silica alumina particles to settle. The methanol solution of extracted tetramethyl ammonium carbonate is decanted from the precipitate. The described treatment with methanol and carbon dioxide and decanting of the salt solution is repeated about four additional times. The thus prepared silica alumina is subjected to evacuation to remove a portion of the solvent, and to provide a damp, gelatinous precipitate of silica alumina precursor.

Instead of following the described route involving the use of tetramethyl ammonium hydroxide, any alternative procedure may be employed to provide a damp silica alumina. A composition of 100 kilograms of such silica alumina is mixed with 15 kilograms of resilient polypropylene powder having a particle size from about 15 to about 55 microns, which composition is shaped into spheroids of about 1 to 13 mm. diameter. These spheroids are dried at 120° C. for three hours to provide silica alumina spheroids sufficiently rugged to withstand a solvent extraction step. Substantially all of the polypropylene is extracted from the spheroids by solvent extraction with refluxing xylene. The thus treated spheroids are activated and stabilized by treatment with steam at 400° C. for three hours to provide cracking catalyst particles having an advantageous combination of activity, selectivity and stability. By reason of the favorable distribution of pores of a range from about 0.1 to 3.0 microns in the silica alumina spheroids, the particles are effective in cracking gas oil to provide a gasoline to coke ratio more advantageous than some silica alumina cracking catalysts which have been employed industrially in recent decades.

EXAMPLE VIII

Several batches of high porosity alumina pellets were prepared following the general procedure and raw materials described in connection with Example I. The pellets were also leached with acetic acid and calcined in accordance with the teachings of Oblad et al. 2,723,947. Data relating to the low density alumina pellets are set forth in Table II.

TABLE II.—PROPERTIES OF LOW DENSITY ALUMINA PELLETS

| | Run No. | | | |
|---|---|---|---|---|
| | A | B | C | D |
| Formula Make-up, parts by wt.: | | | | |
| Beta trihydrate alumina | 100 | 100 | 100 | 100 |
| HNO₃ 70% | 12.22 | 8.7 | 8.7 | 8.7 |
| Demineralized H2O | 11.00 | 16.0 | 10.7 | 13.4 |
| Polypropylene, percent by wt. of Al₂O₃ | 7.9 | 11.5 | 8.4 | 9.9 |
| Loss at 105° C., 2 hr., wt. percent ignited basis | 25.8 | 30.2 | 25.6 | 27.6 |
| Loss 105° C., 760° C., 2 hr., Wt. percent ignited basis | 65.2 | 68.1 | 64.9 | 65.5 |
| Bulk temp. after pelleting, °C | 58 | 52 | 58 | 52 |
| After dehydration and calcination at 565 C. for 2 hours in dry air: | | | | |
| Bulk density, kg./l | 0.692 | 0.630 | 0.678 | 0.641 |
| Crushing sternght, grams | 4,700 | 5,000 | 5,800 | 3,800 |
| Porosity, vol. percent | 66.7 | 68.4 | 67.7 | 67.2 |
| Absorption, wt. percent | 57.9 | 62.3 | 58.7 | 60.6 |
| Surface area, m.²/g | 280 | 290 | 306 | 255 |
| After leaching with acetic acid and heat treatment at 480° C. for 2 hours in dry air: | | | | |
| Bulk density, kg./l | 0.622 | 0.633 | 0.660 | 0.633 |
| Crushing strength, grams | 2,700 | 3,600 | 3,330 | 2,700 |
| Porosity, vol. percent | 68.0 | 70.6 | 69.0 | 69.5 |
| Absorption, wt. percent | 59.4 | 65.5 | 61.1 | 63.3 |

The table indicates that the porosity of the alumina pellets can be high without lowering the crushing strength of the pellet below about 2500 grams. Accordingly the resilient polypropylene particles having a size from about 15 to about 55 microns are shown to be advantageous as porosity agents for alumina pellets.

Various modifications are possible without departing from the scope of the appended claims.

The invention claimed is:
1. In the method of preparing granular particles of sorptive refractory oxide by preparing at about ambient temperature a composition comprising organic particles, components transformable to refractory oxide, and a volatilizable liquid, shaping the composition into granular particles having maximum dimensions of the range from about 1 to 15 mm., thereafter subjecting the granular particles to heat treatment removing at least a portion of the volatilizable liquid to prepare intermediate granular particles having shape-retaining properties, heating the intermediate granular particles at a calcination temperature effective for transformation into granular particles of sorptive refractory oxide, and cooling the calcined particles, the organic particles being removed at some stage prior to the completion of said heat treatment at a calcination temperature, the improvement which consists of: selecting the refractory oxide from the group consisting of $Al_2O_3$, $SiO_2$, and mixtures thereof; selecting as the organic particles resiliently deformable polypropylene microspheres having an average diameter of about 35 microns; controlling the volume concentration of the polypropylene microspheres to be within the range from about 15% to about 19% of the volume of the ultimately prepared granular sorptive refractory oxide particle; controlling the particle size range of the polypropylene microspheres so that the polypropylene microspheres are within a size range from about 1 to about 100 microns; processing the composition comprising water, components transformable to refractory oxides, and the resiliently deformable polypropylene microspheres so that most of the microspheres are distributed with reasonable uniformity throughout the composition; shaping the composition into granular particles; subjecting said granular particles at an elevated temperature to dehydration in a high humidity nitrogen atmosphere whereby substantially all of the polypropylene is thermally decomposed and volatilized, leaving only a minor amount of residual carbonaceous material in the dehydrated granular particles; heating the dehydrated granular particles in an oxygen-containing atmosphere to burn and remove all of said residual carbonaceous material; and cooling the refractory oxide granular particles to provide granular particles having a pore size distribution significantly and advantageously superior to the pore size distribution of refractory oxide granular particles prepared by alternative procedures.

2. The invention of claim 1 in which alumina beta trihydrate is the refractory oxide component, and dilute nitric acid is the volatilizable liquid.

3. In the method for preparing granular particles of sorptive refractory oxide by preparing at about ambient temperature a composition comprising organic particles, components transformable to refractory oxide, and a volatilizable liquid, shaping the composition into granular particles having maximum dimensions of the range from about 1 to 15 mm., thereafter subjecting the granular particles to heat treatment removing at least a portion of the volatilizable liquid to prepare intermediate granular particles having shape-retaining properties, heating the intermediate granular particles at a calcination temperature effective for transformation into granular particles of sorptive refractory oxide, and cooling the calcined particles, the organic particles being removed at some stage prior to the completion of said heat treatment at a calcination temperature, the improvement which consists of: selecting the refractory oxide from the group consisting of $Al_2O_3$, $SiO_2$, and mixtures thereof; selecting as the organic particles resiliently deformable polypropylene microspheres substantially inert to the volatilizable liquid; controlling the volume concentration of the polypropylene microspheres to be within the range from about 14% to about 22% of the volume of the ultimately prepared granular sorptive refractory oxide particles; controlling the particle size range of the polypropylene microspheres so that the polypropylene microspheres are within a size range from about 1 to about 100 microns; processing the composition comprising water, precursors for the refractory oxides, and the resiliently deformable polypropylene microspheres so that most of the microspheres are distributed with reasonable uniformity throughout the composition; shaping the composition into granular particles; subjecting the granular particles to solvent extraction to remove the major portion of the polypropylene; heating the solvent-extracted granular particles in an oxygen containing atmosphere to burn and remove all residual organic material and to dehydrate and transform the granular particles into refractory oxide granular particles; and cooling the refractory oxide granular particles to provide particles having a pore size distribution significantly and advantageously superior to the pore size distribution of refractory oxide granular particles prepared by alternative procedures.

References Cited

UNITED STATES PATENTS

| | | | |
|---|---|---|---|
| 2,603,610 | 7/1952 | Amos et al. | 252—470 |
| 2,697,066 | 12/1954 | Sieg. | |
| 2,723,947 | 11/1955 | Oblad et al. | |
| 2,809,170 | 10/1957 | Cornelius et al. | |
| 3,092,454 | 6/1963 | Doelp | 23—143 |
| 3,162,607 | 12/1964 | Burbidge et al. | 252—477 |
| 3,352,635 | 11/1967 | Machin et al. | 23—142 |
| 3,361,526 | 1/1968 | Magee et al. | 23—143 |
| 3,377,269 | 4/1968 | Bloch | 23—2.2 |

OSCAR R. VERTIZ, Primary Examiner

G. T. OZAKI, Assistant Examiner

U.S. Cl. X.R.

23—142, 182; 208—118, 138; 252—450, 453, 460, 465, 466; 260—680

UNITED STATES PATENT OFFICE
CERTIFICATE OF CORRECTION

Patent No. 3,467,602   Dated September 16, 1969

Inventor(s) DAVID W. KOESTER

It is certified that error appears in the above-identified patent and that said Letters Patent are hereby corrected as shown below:

Column 4, line 28, table, line 3 thereof, "Decativation should read -- Deactivation --.

Column 7, line 59, Table II, "565C" should read -- 565°C

Column 7, line 61, "sterngth" should read -- strength --.

Column 7, line 62, Table, under heading C, "67.7" should read -- 67.6 --.

Column 7, line 66, Table, under heading C, "3330" should read -- 3300 --.

SIGNED AND SEALED
MAY 5 1970

(SEAL)
Attest:

Edward M. Fletcher, Jr.
Attesting Officer

WILLIAM E. SCHUYLER, JR.
Commissioner of Patents